(12) United States Patent
Gustafsson et al.

(10) Patent No.: US 9,549,349 B2
(45) Date of Patent: Jan. 17, 2017

(54) HANDOVER IN A TELECOMMUNICATIONS SYSTEM WITH DISTRIBUTED PROCESSING

(71) Applicant: Telefonaktiebolaget L M Ericsson (publ), Stockholm (SE)

(72) Inventors: Harald Gustafsson, Lund (SE); Johan Eker, Lund (SE); Song Yuan, Sodra Sandby (SE)

(73) Assignee: TELEFONAKTIEBOLAGET L M ERICSSON (publ), Stockholm (SE)

( * ) Notice: Subject to any disclaimer, the term of this patent is extended or adjusted under 35 U.S.C. 154(b) by 0 days.

(21) Appl. No.: 14/653,344

(22) PCT Filed: Jan. 10, 2014

(86) PCT No.: PCT/EP2014/050402
§ 371 (c)(1),
(2) Date: Jun. 18, 2015

(87) PCT Pub. No.: WO2014/108510
PCT Pub. Date: Jul. 17, 2014

(65) Prior Publication Data
US 2015/0350967 A1    Dec. 3, 2015

Related U.S. Application Data

(60) Provisional application No. 61/803,892, filed on Mar. 21, 2013.

(30) Foreign Application Priority Data

Jan. 14, 2013 (EP) ..................................... 13151213

(51) Int. Cl.
*H04W 36/00* (2009.01)
*H04L 29/08* (2006.01)
*H04W 88/08* (2009.01)

(52) U.S. Cl.
CPC .......... *H04W 36/0033* (2013.01); *H04L 67/10* (2013.01); *H04W 88/08* (2013.01)

(58) Field of Classification Search
CPC ..................... H04W 36/0005; H04W 455/436; H04W 36/08; H04W 36/0083
(Continued)

(56) References Cited

U.S. PATENT DOCUMENTS 6,141,683 A    10/2000  Kraml
2002/0075824 A1    6/2002  Willekes
(Continued)

FOREIGN PATENT DOCUMENTS

CN    102591684 A    7/2012
JP    2010/045526 A    2/2010
(Continued)

OTHER PUBLICATIONS

PCT International Search Report, mailed Jun. 6, 2014, in connection with International Application No. PCT/EP2014/050402, all pages.
(Continued)

*Primary Examiner* — Vladimir Magloire
*Assistant Examiner* — Donald H Braswell
(74) *Attorney, Agent, or Firm* — Leffler Intellectual Property Law, PLLC (57) ABSTRACT

A network node comprising a memory and a controller, wherein said controller is configured to: detect that a handover for a mobile communications terminal from a first base station to a second base station and in response thereto determine if an application module associated with the mobile communications terminal is to be migrated, and if so, cause a migration of said application module to be performed.

16 Claims, 5 Drawing Sheets

(58) Field of Classification Search
USPC .................................................. 455/436–444
See application file for complete search history.

(56) References Cited

U.S. PATENT DOCUMENTS

| | | | |
|---|---|---|---|
| 2008/0268844 A1* | 10/2008 | Ma ..................... | H04W 36/0033 455/436 |
| 2009/0119655 A1 | 5/2009 | Quilty | |
| 2010/0120420 A1* | 5/2010 | Agashe ............. | H04W 36/0033 455/432.1 |
| 2010/0159932 A1* | 6/2010 | Park ..................... | H04W 36/28 455/436 |
| 2010/0254346 A1 | 10/2010 | Jain et al. | |
| 2013/0183971 A1* | 7/2013 | Tamaki ............. | H04W 36/0061 455/436 |

FOREIGN PATENT DOCUMENTS

| | | |
|---|---|---|
| KR | 20010019295 A | 3/2001 |
| WO | 02/48876 A1 | 6/2002 |
| WO | 02/073659 A2 | 9/2002 |
| WO | 2009/088327 A1 | 7/2009 |

OTHER PUBLICATIONS

PCT Written Opinion, mailed Jun. 6, 2014, in connection with International Application No. PCT/EP2014/050402, all pages.

Simoens, P. et al. "Optimization Models for Application Migration to Support Mobile Thin Clients" Lecture Notes in Computer Science, Wireless Systems and Mobility in Next Generation Internet, Springer Berlin, Heidelberg, Berlin, pp. 255-270, Jun. 6, 2006, XP019055833, ISBN: 978-3-540-70968-8.

Hoojgaard-Hansen, K. et al. "Session mobility solution for client-based application migration scenarios" IEEE 2011 Eighth International Conference on Wireless On-Demand Network Systems and Services, pp. 76-83, Jan. 26, 2011, XP031981008, ISBN: 978-1-61284-189-2.

Cao, J. et al. "Seamless Mobility Support for Adaptive Applications in Hetereogeneous Wireless Networks" IEEE 2010 7th International Conference on Autonomic & Trusted Computing, IEEE, Piscataway, NJ, USA, pp. 217-222, Oct. 26, 2010, XP031834885, ISBN: 978-1-4244-9043-1.

Handorean, R. et al. "Context Aware Session Management for Services in Ad Hoc Networks" 2005 IEEE International Conference on Services Computing, IEEE, Piscataway, NJ, USA, vol. 1, pp. 113-120, Jul. 11, 2005, XP010852244, ISBN: 978-0-7695-2408-5.

* cited by examiner

HANDOVER IN A TELECOMMUNICATIONS SYSTEM WITH DISTRIBUTED PROCESSING

CROSS-REFERENCE TO RELATED APPLICATIONS

This application claims priority under 35 U.S.C. §119 to European Patent Application No. 13151213.9, filed Jan. 14, 2013, which is hereby incorporated herein by reference in its entirety. This application also claims the benefit of U.S. Provisional Application No. 61/803,892, filed Mar. 21, 2013, which is hereby incorporated herein by reference in its entirety.

TECHNICAL FIELD

This application relates to a method, a mobile communications terminal and a computer program product for effecting a handover in a telecommunications system with distributed processing, such as in a telecommunications system using a dataflow programming model, and in particular to a method, a mobile communications terminal and a computer program product for effecting a handover of an actor in a dataflow programming model in a telecommunications system, possibly when effecting a handover from a first base station to a second base station.

BACKGROUND

Mobile communications terminals, such as mobile phones, smart phones and tablet computers, are becoming more and more advanced and the applications that are developed for these mobile communication terminals are also becoming more and more advanced requiring more and more computing power to be executed efficiently. However, to keep the cost of the mobile communication terminals low, the computing power of the mobile communication terminals often do not increase at the same pace as the demands of the applications that are to be run on the mobile communications terminals.

Since the development in the computer industry, and thereby also the mobile phone market and the tablet computer market, is so fast (with exponential growth as regards processor speed and memory space) it becomes difficult for a user to efficiently execute new applications on an older smartphone, tablet computer or other mobile communication terminal, without having to upgrade the mobile communication terminal.

There is thus a need for a mobile communications terminal that allows applications that require a lot of computing power to be executed efficiently. There is also a need that such execution is performed efficiently and uniformly even if the terminal is a mobile communication terminal which is moving.

SUMMARY

It is an object of the teachings of this application to overcome at least the problems listed above by providing a network node comprising a memory and a controller, wherein said controller is configured to detect that a handover for a mobile communications terminal from a first base station to a second base station and in response thereto determine if an application module associated with the mobile communications terminal is to be migrated, and if so, cause a migration of said application module to be performed.

It is also an object of the teachings of this application to overcome the problems listed above by providing a method for use in a mobile communications terminal comprising a memory and a controller, said method comprising detecting that a handover for a mobile communications terminal from a first base station to a second base station and in response thereto determining if an application module associated with the mobile communications terminal is to be migrated, and if so, causing a migration of said application module to be performed.

It is also an object of the teachings of this application to overcome the problems listed above by providing a computer readable storage medium encoded with instructions that, when executed on a processor, perform the method according to above.

By arranging for a distributed processing of an application in a telecommunications network and to determine if the distributed application modules being instances of the executed application are to be migrated as a hand over is to be effected, the problems of the prior art are overcome and allows applications that require a lot of computing power to be executed efficiently and that such execution is performed efficiently and uniformly even if the terminal is a mobile communication terminal which is moving.

The teachings provided herein may beneficially be used in telecommunications networks to which a mobile communications terminal can connect, and thus become part of, for execution of an application.

The authors of the present application have realized, after inventive and insightful reasoning that by implementing an execution environment for applications based on an actor-dataflow model allows for applications to be transferred with low overhead and hence enable to closely track a mobile user when it does a handover. Due to the low overhead it is possible to offer low latency services also for mobile use cases. An example use case is for a mining company that has a base station for each shaft and deploys automation control of mining equipment on the base stations. The mining equipment is mobile and moves between shafts. Another example is autonomous transports (on public roads) where the automation control application is deployed on cellular connected vehicles and in the closest base station (for the inter-control). The inter-control actor(s) will be handed-over between base-stations' servers.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The actions of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
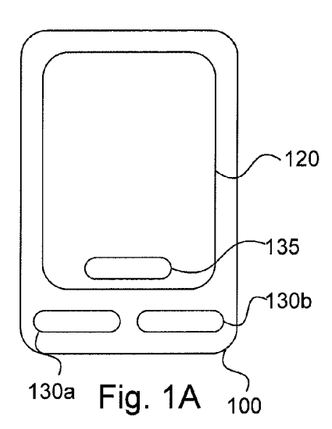
FIGS. 1A and 1B are each a schematic view of a mobile communications terminal according to an embodiment of the teachings herein.
Figure 1B:
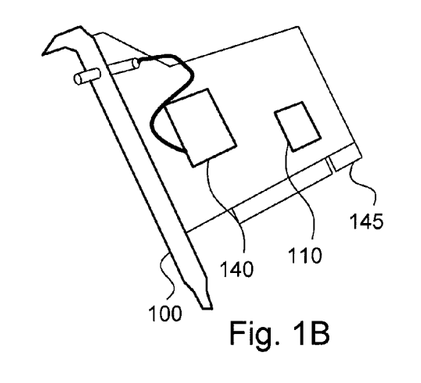

FIGS. A and 1B each generally shows a mobile communications terminal 100 according to an embodiment herein. Examples of such a mobile communications terminal 100 are an internet tablet, a mobile telephone, a smart phone and a personal digital assistant. These examples are signified in that they have an advanced user interface. Other examples are devices with a cellular modem, such as computers, Input/Output devices, Automation controllers, electronic controller units, actuators, sensors, gateways to mention a few. These examples are signified in that they have a limited user interface if any. Regardless of the user interface capabilities of the examples, such mobile communications terminals 100 may be used as a user equipment UE in a mobile communications network. The UE may act as a network node in such a mobile communications network.

Referring to FIG. 1A a smartphone 100 comprises a housing in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 is dependent on the design of the smartphone 100 and an application that is executed on the smartphone 100.

Referring to FIG. 1B a cellular modem device 100 is illustrated. The cellular modem device comprises a controller 110 and a radio frequency interface or modem 140. The cellular modem device further comprises connectors 145 for connecting to an external device (not shown) which the cellular modem 100 may be integrated with. Such external devices may be computers, microcomputers or other controllers. The connectors 145 may also be for providing an optional I/O interface, for example for receiving data form and/or sending data to a display, touch screen, keys, relays, sensors (acceleration, position, pressure, temperature, voltage, current, lightning, etc), motor controllers, solenoid controllers, to name a few.

Figure 2:
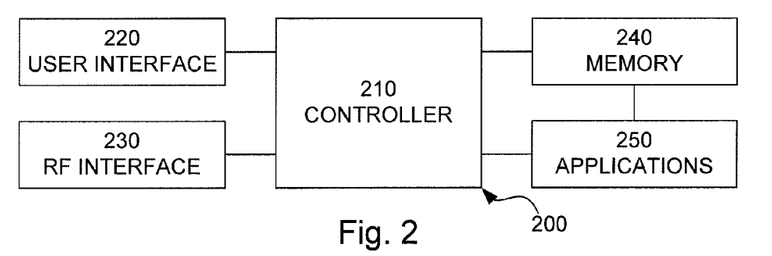
FIG. 2 is a schematic view of the components of a mobile communications terminal according to the teachings herein.

FIG. 2 shows a schematic view of the general structure of a mobile communications terminal according to FIGS. 1A and 1B. The mobile communications terminal 200 comprises a controller 210 which is responsible for the overall operation of the mobile communications terminal 200 and is preferably implemented by any publically available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the mobile communications terminal 200. The memory 240 may be implemented using any commonly known technology for computer-readable memories such as ROM, RAM, SRAM, DRAM, CMOS, FLASH, DDR, EEPROM memory, flash memory, hard drive, optical storage or any combination thereof. The mobile communications terminal 200 further comprises one or more applications 250. The applications are sets of instructions that when executed by the controller 210 control the operation of the mobile communications terminal 200. The memory 240 is used for various purposes by the controller 210, one of them being for storing application data and program instructions, possibly as part of the applications 250, for various software modules in the mobile communications terminal 200. The software modules include a real-time operating system, possibly drivers for a user interface 220, an application handler as well as various applications 250.

The application 250 may include a messaging application, an automation control application configured to monitor and control a physical or chemical process, a surveillance application, a remote control application, an intelligence application having knowledge and reasoning support, and a data collection, processing and storage application.

It should be noted that the application is in one specific embodiment an application not related with network functionality.

The mobile communications terminal 200 may further comprise a user interface 220, which in the mobile communications terminal 100 of FIG. 1A, is comprised of the display 120 and the keypad 130. The user interface (UI) 220 also includes one or more hardware controllers, which together with the user interface drivers cooperate with the display 120, keypad 130, as well as various other I/O devices such as sound system, LED indicator, etc. As is commonly known, the user may operate the mobile communications terminal 200 through the man-machine interface thus formed.

The mobile communications terminal 200 further comprises a radio frequency interface 230, which is adapted to allow the mobile communications terminal to communicate with other devices through a radio frequency band through the use of different radio frequency technologies. Examples of such technologies are IEEE 802.11, IEEE 802.15, ZigBee, WirelessHART, WIFI, Bluetooth®, W-CDMA, GSM, UTRAN, LTE, and NMT to name a few. The mobile communications terminal 200 may further comprise a wired interface, which is adapted to allow the mobile communications terminal to communicate with other devices through the use of different network technologies. Examples of such technologies are (Controller Area Network) CAN-bus, USB, Ethernet, and Local Area Network, TCP/IP (Transport Control Protocol/Internet Protocol) to name a few.

The controller 210 is configured to operably execute applications 250 such as the web browsing or email application through the RF interface 230 using software stored in the memory 240 which software includes various modules, protocol stacks, drivers, etc. to provide communication services (such as transport, network and connectivity) for the RF interface 230 and optionally a Bluetooth interface and/or an IrDA interface for local connectivity.

Figure 3:
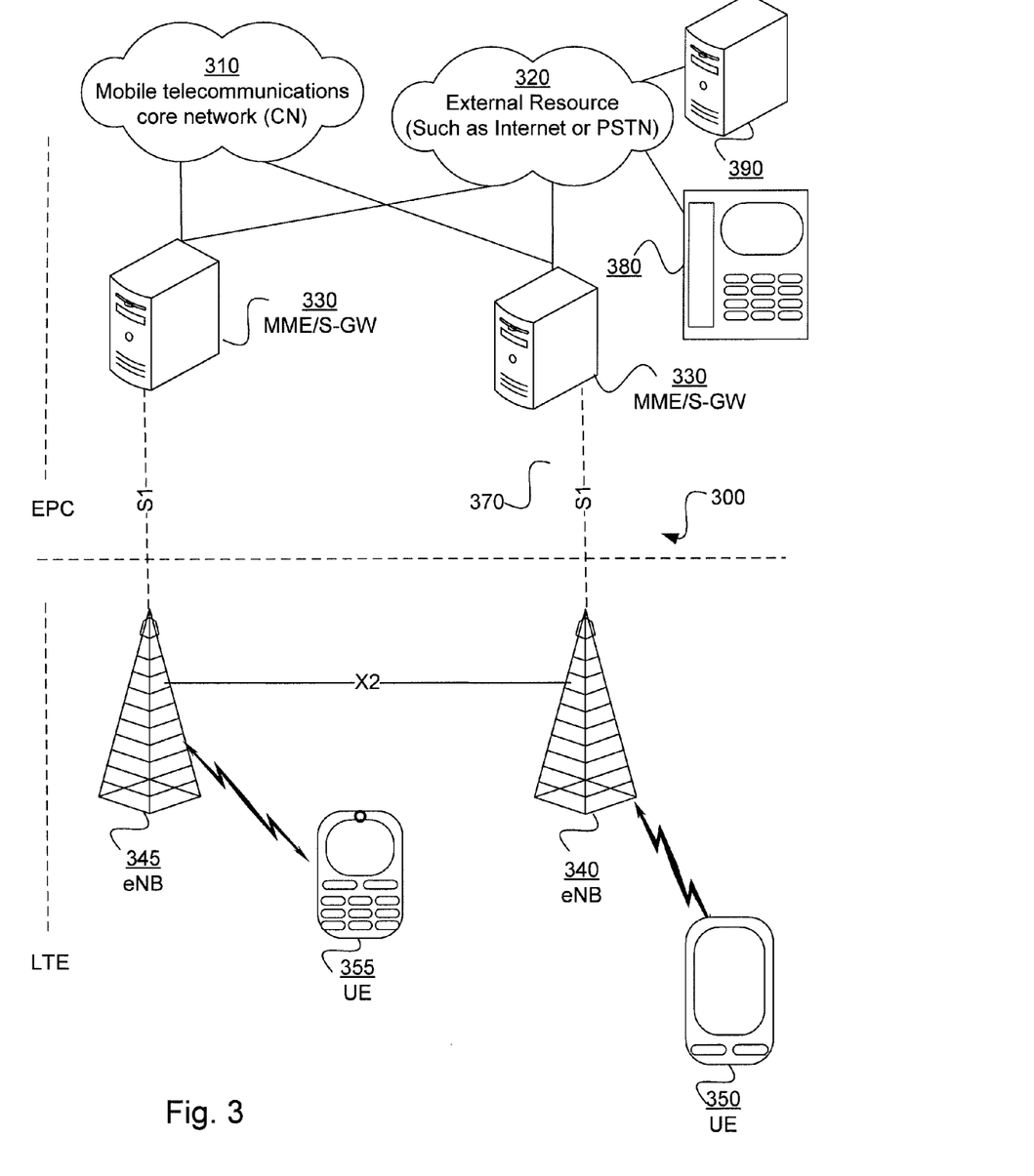
FIG. 3 shows a schematic view of a telecommunications network comprising a mobile communications terminal according to one embodiment of the teachings of this application.

FIG. 3 shows a schematic view of the general structure of a telecommunications system 300 according to the teachings herein. In the telecommunication system of FIG. 3, various telecommunications services such as cellular voice calls, www/wap browsing, cellular video calls, data calls, data packet transfers, facsimile transmissions, music transmissions, still image transmissions, video transmissions, electronic message transmissions and electronic commerce may be performed between a mobile communications terminal or User Equipment (UE) 100, 200, 300, 350 according to the disclosed embodiments and other communications terminals, such as another mobile communications terminal 355 or a stationary telephone. The mobile communications terminals 350, 355 are connected to a mobile telecommunications network 310 through Radio Frequency links via base stations 340.

It should be noted that as a mobile communications terminal 350 may not always be part of a network 300, but are to be connected to a network 300, for the purpose of this application it will be assumed that as a mobile communications terminal 350 connects to the network 300 it effectively becomes part of the network 300 as a network node.

The telecommunications system 300 comprises at least one server 330. A server 330 has a data storage and a controller that may be implemented by any publically available CPU ("Central Processing Unit"), DSP ("Digital Signal Processor") or any other electronic programmable logic device. In one embodiment such a server is a Mobility Management Entity (MME). In one embodiment such a server is a Gateway (GW). In one embodiment such a server is an application module execution server. The servers 330 are configured to communicate with a mobile telecommunications core network (CN) 310 and/or an external resource 320 such as the internet or a Public Switched Telephone Network (PSTN). A PSTN 320 is configured to communicate with and establish communication between stationary or portable telephones 380. In one embodiment the external resource comprises or is configured to communicate with an external service provider 390. In one embodiment the servers 330 are configured to communicate with other communications terminals using a packet switched technology or protocol. In such an embodiment the servers 330 may make up an Evolved Packet Core (EPC) layer.

The servers 330 are configured to communicate with network nodes, such as base stations 340, 345. The server 330 may also be considered to be a network node. In the example embodiment of FIG. 3 there are shown two base stations 340, 345 In one embodiment the base stations 340, 345 are evolved Node Bases (eNB). A base station 340, 345 is further configured to communicate with at least one server 330. In one embodiment the communication between a server 330 and a base station 340, 345 is effected through a standard or protocol 370. In one embodiment the protocol is S1. A base station 340, 345 is configured to communicate with another base station 340, 345. In one embodiment the communication between a base station 340, 345 and the at least one another base station 340, 345 is effected through a standard or protocol. In one embodiment the protocol is X2. A base station 340, 345 is further configured to handle or service a cell. In one embodiment the at least one base stations 340, 345 make up a Long Term Evolution (LTE) layer. In one embodiment the at least one base stations 340, 345 make up an LTE Advanced layer. Note that the S1 and/or X2 protocols may be implemented to operate on a wired or wireless interface.

In one embodiment the base station 340, 345 is configured to communicate with a mobile communications terminal 350 (100) through a wireless radio frequency protocol.

In one embodiment the telecommunications system 300 is an Evolved Packet System (EPS) network. In one embodiment the telecommunications system is a system based on the 3GPP (3rd Generation Partnership Project) standard. In one embodiment the telecommunications system is a system based on the UMTS (Universal Mobile Telecommunications System) standard, such as W-CDMA (Wideband Code Division Multiple Access). In one embodiment the telecommunications system is a system based on a telecommunications standard such as GSM, D-AMPS, CDMA2000, FOMA or TD-SCDMA.

It should be noted that the teachings herein may also be used with other networks, for example a network based on the LTE portion of the network in FIG. 3 arranged to operate in cooperation with a packet switched EPC. Such networks are commonly known to a skilled person and will not be disclosed in further detail.

Figure 4:
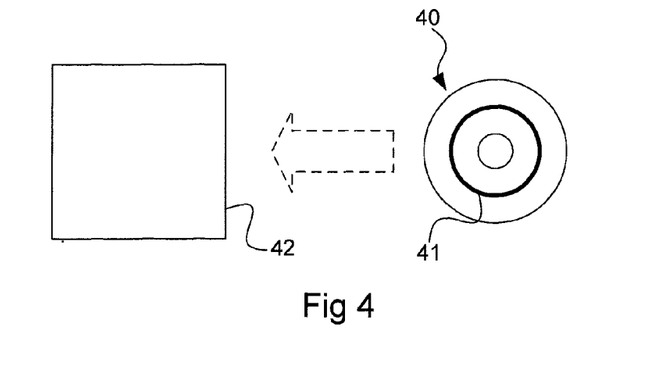
FIG. 4 shows a schematic view of a computer-readable medium according to one embodiment of the teachings of this application.

FIG. 4 shows a schematic view of a computer-readable medium as described in the above. The computer-readable medium 40 is in this embodiment a data disc 40. The data disc is configured to carry instructions 41 that when loaded into a controller, such as a processor, executes a method or procedure according to the embodiments disclosed above. The data disc 40 is arranged to be connected to and read by a reading device 42, such as network node, for loading the instructions into the controller. It should be noted that a computer-readable medium can also be other mediums such as compact discs, digital video discs, hard drives, a flash memory or other memory technologies commonly used. The instructions can also be downloaded from the computer-readable medium via a wireless or wired interface to be loaded into the controller.

A computer-readable medium may beneficially be used for carrying or storing an application. An application may be specific to a UE, a base station or a server, or be shared among one or more entities, such as network nodes. For shared applications the entities sharing the application need to have a copy of relevant instructions (software code) as well as a the current state of the aspect of the application relevant to the entity to execute the application module. An application module is an executional instance of a (shared) application comprising the state of the application that is to be shared. The state of an application includes (but is not limited to) the instructions currently being executed and relevant operational data stored in registers, memories and such. By transferring the state form one entity to another entity, the new entity is able to resume execution of the application as if the execution continued on the first entity.

Actor/Data-flow modeling is a paradigm for streaming applications, such as the application 250 of the UE 100, 200, for distributed computing and parallel platforms in general. This more constrained programming model benefits high-level transformations and facilitates advanced code optimizations and run-time deployment. The programming model allows for one application to be distributed over several different hardware units. For example, by deploying one or several actors or application modules in an application on different available software servers. The software servers may be implemented in a server 600, a base station 500, an MDC (720) or a UE 100.

In the dataflow paradigm a program or application is described as a graph of actors or application modules, also known as function units, that communicate asynchronously using message passing, so-called tokens. The actor can have state information indicating the current state of the application, that is (as discussed above) the current code segment being executed and the value(s) stored in any associated processor registers and possibly other control data for various parameters or variables. The programming model is a natural fit for many traditional Digital Signal Processing applications such as audio and video coding, radio base band algorithms, cryptography applications, automation, etc. Data flow decouples the program specification from the available level of parallelism in the executing hardware since the actual mapping of tasks onto threads, processes, cores and devices possibly is not done in the application code but in the compilation and deployment phase. The designer of the application is thus not required to know the actual structure of the executing hardware system. This is beneficial in designing application that are to be used in varying infra structures such as differing models and makes for communication terminals, different network infrastructures and varying communication modes.

Traditionally when deploying application in the cloud this is done on a virtualized machine (VM) which then is executed on a physical machine. There exist methods for moving such complete VMs between physical machines, typically in a paused state. Such VMs are large containing a complete operating system like Linux and all installed user libraries and applications (typically several different).

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 5:
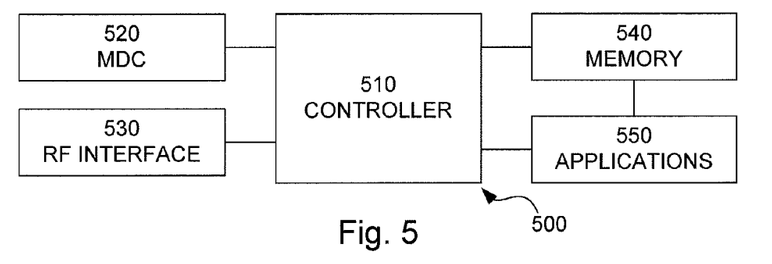
FIG. 5 is a schematic view of the components of a base station according to the teachings herein.

FIG. 5 shows a schematic view of the general structure of a server 330 according to FIG. 3. The server 500 comprises a controller 510 which is responsible for the overall operation of the server 500 and is preferably implemented by any commercially available CPU ("Central Processing Unit"), DSP ("Digital Signal Processor") or any other electronic programmable logic device. The controller 510 may be implemented using instructions that enable hardware functionality, for example, by using executable computer program instructions in a general-purpose or special-purpose processor that may be stored on a computer readable storage medium (disk, memory etc) 540 to be executed by such a processor. The controller 510 is configured to read instructions from the memory 540 and execute these instructions to control the operation of the server 500. The memory 540 may be implemented using any commonly known technology for computer-readable memories such as ROM, RAM, SRAM, DRAM, CMOS, FLASH, DDR, EEPROM memory, flash memory, hard drive, optical storage or any combination thereof. The server 500 further comprises one or more applications 550. The applications are sets of instructions that when executed by the controller 510 control the operation of the server 500. The memory 540 is used for various purposes by the controller 510, one of them being for storing application data and program instructions 550 for various software modules in the server 500. The software modules include a real-time operating system, drivers for a man-machine interface 550, an application handler as well as various applications 550. The applications 550 can include a network controlling application, a UE specific application such as a messaging application, a browsing application, a media player application, an automation control application configured to monitor and control a physical or chemical process, a surveillance application, a remote control application, an intelligence application having knowledge and reasoning support, and a data collection, processing and storage application.

The memory 540 and the controller 510 may implement a micro data center (MDC) 520 designed to receive data possibly associated with an application 550 and process the data. The micro data center 520 may be incorporated in the server 500 or it may be connected to the server 500.

The server 500 further comprises a radio frequency interface 530, which is adapted to allow the server to communicate with other devices through a radio frequency band through the use of different radio frequency technologies. Examples of such technologies are UMTS, W-CDMA, GSM, UTRAN, LTE, NMT to name a few.

The controller 510 is configured to operably execute applications 550 such as the web browsing or email application through the RF interface 530 using software stored in the memory 540 which software includes various modules, protocol stacks, drivers, etc. to provide communication services (such as transport, network and connectivity) for the RF interface 530. The RF interface 530 comprises an internal or external antenna as well as appropriate radio circuitry for establishing and maintaining a wireless link to a base station. As is well known to a person skilled in the art, the radio circuitry comprises a series of analogue and digital electronic components, together forming a radio receiver and transmitter. These components include, i.e., band pass filters, amplifiers, mixers, local oscillators, low pass filters, AD/DA converters, etc.

Figure 6:
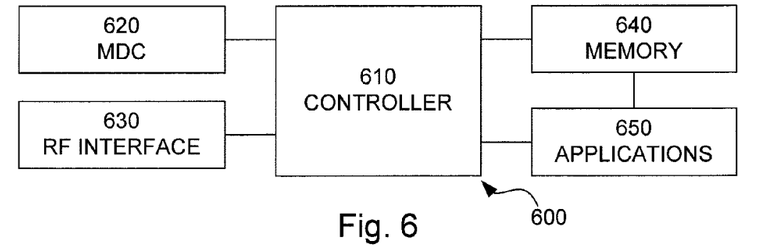
FIG. 6 is a schematic view of the components of a server according to the teachings herein.

FIG. 6 shows a schematic view of the general structure of a base station 340, 345 according to FIG. 3. The base station 600 comprises a controller 610 which is responsible for the overall operation of the base station 600 and is preferably implemented by any commercially available CPU ("Central Processing Unit"), DSP ("Digital Signal Processor") or any other electronic programmable logic device. The controller 610 may be implemented using instructions that enable hardware functionality, for example, by using executable computer program instructions in a general-purpose or special-purpose processor that may be stored on a computer readable storage medium (disk, memory etc) 640 to be executed by such a processor. The controller 610 is configured to read instructions from the memory 640 and execute these instructions to control the operation of the base station 600. The memory 640 may be implemented using any commonly known technology for computer-readable memories such as ROM, RAM, SRAM, DRAM, CMOS, FLASH, DDR, EEPROM memory, flash memory, hard drive, optical storage or any combination thereof. The base station 600 further comprises one or more applications 660. The applications are sets of instructions that when executed by the controller 610 control the operation of the base station 600. The memory 640 is used for various purposes by the controller 610, one of them being for storing application data and program instructions 650 for various software modules in the base station 600. The software modules include a real-time operating system, drivers for a man-machine interface 650, an application handler as well as various applications 650. The applications 650 can include a network controlling application, a UE specific application such as a messaging application, a browsing application, a media player application, an automation control application configured to monitor and control a physical or chemical process, a surveillance application, a remote control application, an intelligence application having knowledge and reasoning support, and a data collection, processing and storage application.

The memory 640 and the controller 610 may implement a micro data center (MDC) 620 designed to receive data possibly associated with an application 650 and process the data. The micro data center 620 may be incorporated in the base station 600 or it may be connected to the base station 600.

The base station 600 further comprises a radio frequency interface 630, which is adapted to allow the server to communicate with other devices through a radio frequency band through the use of different radio frequency technologies. Examples of such technologies are UMTS, W-CDMA, GSM, UTRAN, LTE, NMT to name a few.

The controller 610 is configured to operably execute applications 650 such as the web browsing or email application through the RF interface 630 using software stored in the memory 640 which software includes various modules, protocol stacks, drivers, etc. to provide communication services (such as transport, network and connectivity) for the RF interface 630. The RF interface 630 comprises an internal or external antenna as well as appropriate radio circuitry for establishing and maintaining a wireless link to a base station. As is well known to a person skilled in the art, the radio circuitry comprises a series of analogue and digital electronic components, together forming a radio receiver and transmitter. These components include, i.e., band pass filters, amplifiers, mixers, local oscillators, low pass filters, AD/DA converters, etc.

A micro data center may be implemented in one or more of the network nodes in a mobile telecommunications network such as that of FIG. 3. They may be implemented as a server, potentially virtual, that is incorporated in a network node or operatively connected to a network node.

In the example of FIG. 3, the micro data centers may communicate with each other through the interfaces S1 and X2 depending on their placement.

Figure 7:
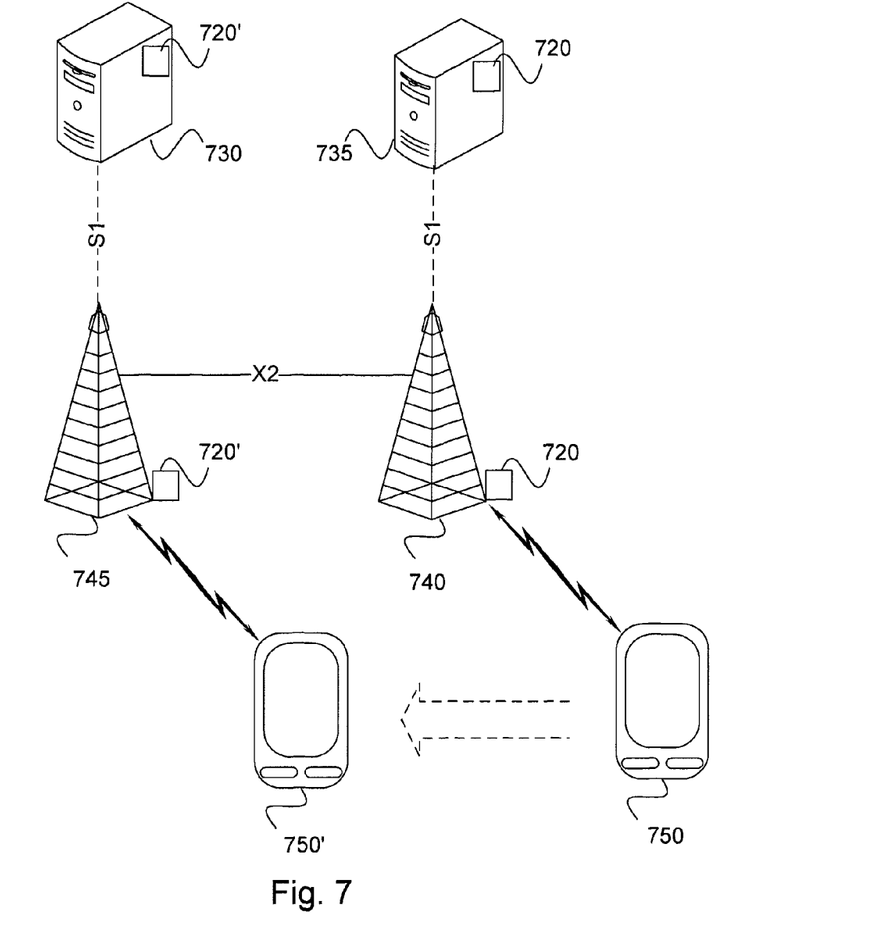
FIG. 7 shows a schematic view of a telecommunications network according to one embodiment of the teachings of this application.

FIG. 7 shows a schematic view of a telecommunications network 700, such as the network 300 of FIG. 3, which in the example of FIG. 7 has five network nodes. The five network nodes are: two servers, a first server 730 and a second server 735 such as the server 600 of FIG. 6 or the server 330 of FIG. 3; two base stations (eNB), a first eNB 740 and a second eNB 745 such as the eNB 500 of FIG. 5 or the base stations 340, 345 of FIG. 3; and one mobile communications terminal or User Equipment, UE 750, such as the UE 100 of FIG. 1 or the UE 350, 355 of FIG. 3. The first eNB 740 is arranged to communicate with the first server through an S1 interface, to communicate with the second eNB 745 through an X2 interface and to communicate with the UE 750 through a wireless radio frequency interface, such as according to the radio access technology standard LTE.

It should be noted that the connections illustrated in FIG. 7 (and alter in FIG. 8) are only for exemplary purposes and other constellations are also possible. For example it is conceivable to have connections between the first server 730 and the second server 735 as well as between the first base station 740 and the second server 735 and also between the second base station 745 and the first server 730. As an option to the X2 interface the first base station 740 may send data (such as in a migration as will be disclosed below in detail) to the second base station 745 via the first server 730 and the second server 735. The first eNB 740 is arranged with a micro data center (MDC) 720 arranged to execute an application module (not shown explicitly in FIG. 7). As has been discussed in the above, the application modules are executional instances of an application (referenced 550 and 650 in FIGS. 5 and 6). Alternatively or additionally, the first server 730 is arranged with at least one micro data center (MDC) 720 arranged to execute an application module. As would be apparent an MDC may be implemented to be a part of a server or vice versa an MDC may be implemented to comprise one or several servers. This description will not focus on the exact configuration of an MDC, but focus on the functionality of the teachings herein in which an MDC may be utilized as a processing center. In this example the MDCs 720 of the first server 730 and the first eNB 740 are arranged to execute application modules associated with the same application and the application is associated with the UE 750. The application is divided into application modules and distributed to various network nodes which execute their application modules according to an actor-dataflow model. Details of such distributed execution have been discussed in the above. Other examples of computational models are server-client model, Model-View-Controller (MVC) model, peer-to-peer model to name a few. In the following there will not be made any distinction whether it is a network node or an MDC that perform the execution of an application module. Nor will there be made any distinction whether the MDC is a part of the network node, either as an incorporated integrated circuit module or as a software module, or if the MDC is connected to the network node.

Furthermore, in this example the UE 750 is mobile, moving away from the first eNB 740 towards the second eNB 745 as indicated by the dashed arrow in FIG. 7. As the UE 750 moves away from the first eNB 740 and towards the second eNB 745 it will be detected that a handover is necessary for the UE 750 from the first eNB 740 to the second eNB 745.

It should be noted that the description herein will focus on the situation where it is detected that a handover is to be effected, but the teachings herein may also be used in an implementation where it is detected that a handover is taking place or that a handover has taken place. As will be discussed in further detail, any determinations necessary may thus be taken also by a receiving network node, even if the description herein focuses on the network nodes handing over the mobile communications terminal.

As a network node detects that a handover for the UE 750 is to be executed the controller (not shown explicitly in FIG. 7, but referenced 210 in FIG. 2, 510 in FIGS. 5 and 610 in FIG. 6 for the respective network nodes) is configured to determine if the UE 750 is associated with an application whose execution is distributed through execution of one or more application modules, possibly in MDCs 720 in the network 700. If the UE 750 is associated with such an application, the network node determines whether one or more of the one or more application modules are to be migrated from their currently executing network node.

In one embodiment it is the first eNB 740 that is configured to determine whether a migration is to be made or not.

In one embodiment it is the first server 730 that is configured to determine whether a migration is to be made or not.

In one embodiment it is the UE 750 that is configured to determine whether a migration is to be made or not.

In one embodiment it is a combination of the first server 730 and/or the first eNB 740 and/or the UE 750 that is configured to determine whether a migration is to be made or not.

In the following example, it is the first eNB 740 that is configured to determine whether a migration is to be made or not, but it should be understood that the teachings herein are not to be construed as to be limiting to this example.

As the first eNB 740 detects that a handover is to be executed, it is configured to determine whether a migration of any application modules is to be executed. It should be noted that, as in the prior art, the determination whether to handover a UE may be made by a base station 740, 745 or a server 730,735. The general procedures involved in determining whether to handover or not are well-known in the art and will, as such, not be discussed in further detail.

However, in one embodiment, the determination whether to handover or not may also be based on the number of application modules that are potentially to be migrated and the data traffic and processing required to effect the migration.

In one embodiment the first eNB 740 is configured to query a database (remotely stored or locally stored in a memory for example the memory 540 of the first eNB 740 or possibly in the MDC 720 of the first eNB 740) whether the UE 750 is associated with a distributed application and/or an application module and to receive a response to the query from the database.

The database may be implemented as a register or a table or other logical reference structure maintaining a reference between distributed applications (and their application modules), the associated UE 750 and the locality of the execution of the corresponding application module(s), such as the MDCs 720. In the example of FIG. 7, the eNB 740 queries a local register (database) and receives the query response that an application module is being executed in the MDC 720.

In one embodiment the first eNB 740 is also or alternatively configured to query another network node whether the network node is currently executing an application module associated with the UE 750. In the example of FIG. 7, the first eNB 740 queries the first server 730 and receives the query response that an application module is being executed in the MDC 720 of the first server 730.

Alternatively or additionally the first eNB 740 may be configured to query a database, to query other network nodes (possibly other servers (not shown), other eNBs (not shown) or other UEs (not shown), and/or to query another network node's database. The queries made by the first eNB 740 in this example are thus an example of such a combination of queries.

If the query response(s) indicates that the UE 750 is associated with one or more application modules, the controller 510 is configured to determine that the migration is to be effected for at least on of the application modules. The determination is based on the programming and/or constraints of the corresponding application, the resources of the network nodes currently executing an application module and/or the resources of a receiving network node, that is, the network node that the migration is potentially to be effected to.

The determining network node, in this example the first eNB 740, is thus configured to query other network nodes, such as the receiving second eNB 745, whether the second eNB 745 has the resources to take over the execution of the application module.

The determination may also or alternatively be based on the identity of the UE 750 (for example whether the UE 750 is a controlling UE for the corresponding application). A controlling UE may for example be a UE providing the primary interaction with an application, a UE controlling the life cycle of the application or a UE executing a main thread of the application. Such determinations will be discussed in further detail with reference to FIG. 8 in the below. It should be noted that the UE 750 that is about to be handed over, may not necessarily be the UE controlling the application.

It should be noted that even though the example of FIG. 7 is aimed at the handing over network node(s) (the first server 730 and/or the first eNB 740) making the determination, it is also possible that it is the receiving network node(s) (the second server 735 and/or the second eNB 745) that make the determination. It is also possible that the determination is made by a combination of handing over network node(s) and receiving network node(s).

In one embodiment the network node may also be configured to receive an input from for example a server or the backhaul (not shown) of the network, wherein the input possibly carries a command to migrate or information regarding the possible migration. The network node may then determine that whether the migration is to be done based on the command and/or information. In one embodiment the input may be received from another UE.

Figure 8:
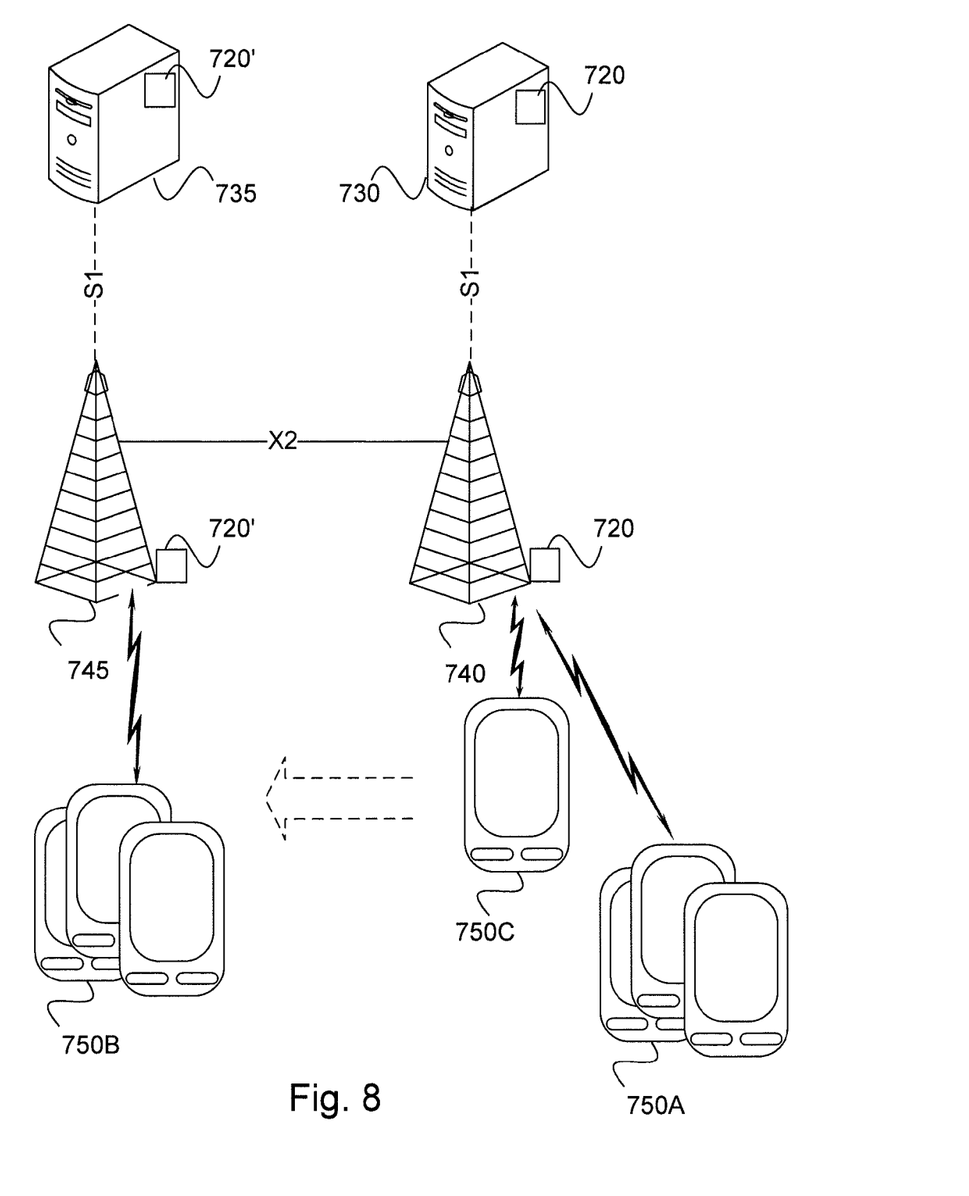
FIG. 8 shows a schematic view of a variation telecommunications network according to one embodiment of the teachings of this application.

FIG. 8 shows a schematic view of a telecommunications network 800 being a variation of the telecommunications network 700 of FIG. 7. In the telecommunications network 800 of FIG. 8 a plurality of UEs are shown. The UEs are shown as belonging to three groups, namely a first group of UEs 750A which are connected to the first eNB 740 (or other eNBs—not shown—cooperating with the first eNB 740), a second group of UEs 750B which are connected to the second eNB 745 (or other eNBs—not shown—cooperating with the second eNB 745) and a third group of at least one UE 750C that is to be handed over from the first eNB 740 to the second eNB 745.

In the example of FIG. 8 the application may be associated with more than one UE, and may be associated with at least one UE in each of the three UE groups 750A, 750B and 750C. The corresponding application modules may correspondingly be distributed among the three UE groups 750A, 750B and 750, the first eNB 740 and the second eNB 745 an the first server 730 and the second server 735.

The determination whether the migration is to be effected will be made for at least a portion of the associated application modules. For example, possibly only the application modules being directly associated with the UEs of the UE group 750C that is to be handed over should be migrated. Alternatively and/or additionally, the application modules associated with the UEs of the first UE group 750A should (also) be migrated.

The determination whether an application module should be migrated or not is, in one embodiment, based on the identity or role of the UEs 750C to be handed over. For instance, if one or all of the UEs in the UE group 750C to be handed over is currently executing or controlling the execution of the central application, it may be determined that as the controlling UE 750C is handed over, all application modules associated with the central application should be migrated. The determination to migrate may also be based on the number of UEs in the three UE groups 750A, 750B and 750C. For example if it is determined that after the handover of group 750C (which may very well consist of a single UE) that the plurality of UEs associated with the application will be in the second group 750B, the application modules associated with the UEs in the group to be handed over are to be migrated.

It may, in such situations, also be determined that all application modules associated with the application are to be migrated.

The determination to migrate an application module between the first base station 740 and the second base station 745 for example, could also be based on whether the amount of traffic between associated application modules and UEs in group 750B and 750C is larger than the amount of traffic from UEs in 750A to the associated application modules. The determination to migrate an application module between the first base station 740 and the second base station 745 for example could also be based on if associated application modules have been activated more recently by controlling UEs in group 750B and 750C or from UEs in 750A.

As has been disclosed above, the determination whether a migration is to be made or not, may be made by a server 730, 735, a base station 740, 745 and/or a UE 750A, 750B, 750C.

Figure 9:
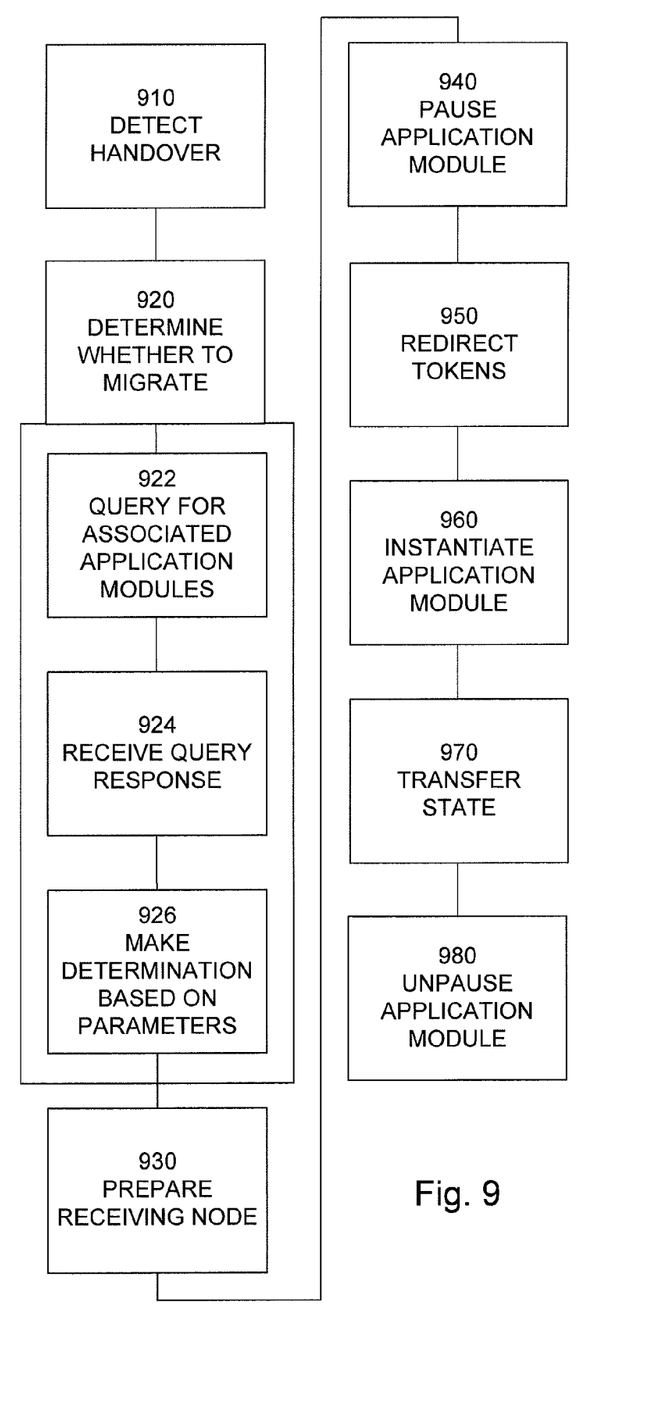
FIG. 9 shows a flowchart for a method according to one embodiment of the teachings of this application.

FIG. 9 shows a flowchart of a general method of the teachings herein. A network node detects 910 that a handover of a UE is to be effected and in response thereto determines 920 whether an application module should be migrated or not. The determination is done by querying 922 whether the UE is associated with an application module, receiving 924 a response indicating an associated application module and determining 926 based on parameters, such as resources, role of UE, etc if the application module is o be migrated or not.

Migration

After it has been determined that the migration is to be performed, in a manner as discussed above, a network node is configured to cause the migration to be executed. In one embodiment, the network node making the determination to migrate also executes the migration. In one embodiment, the network node making the determination to migrate instructs one or more other network nodes to (at least partially) execute the migration.

The migration is executed by preparing 930 the receiving network node, which in this example is the second base station 745 (possibly the MDC 720 associated with the receiving base station 745), to set up the application module logic, in other words start execution of corresponding software for the application (module) (possibly after receiving the software from the handing over network nodes or possibly after receiving instructions to download and consequently downloading the software or application instructions possibly from an external source, a server or the backhaul of the network (not shown)). Thereafter, the execution of the application modules that need to be moved is paused 940 (while allowing other parts of the application to continue executing). As the target network node is ready to execute the application module, the tokens (or other means used to enable communication between the application modules, such as data packets or communication messages) are redirected 950 to the receiving network node 745 (so that any new tokens will arrive at the correct network node) and the application module is instantiated 960 in the second base station 745 and the state of the application module is transferred 970 from first base station 740 to the second base station 745. The application module may be instantiated by loading the received software into a ready-to-execute condition. One example is loading a software library containing the software with the application module into a runtime. Another is starting a new process/thread with the application module corresponding to the executable.

To finalize the migration the moved application module in the second base station 745 is unpaused 980 to resume execution at the same state in the new network node.

One alternative migration or migration execution is instead of pausing and unpausing the application module, the state and tokens are transferred to the target network node and further tokens are directed at the target and handing over network node for both instances of the application module. During a migration both instances are executed concurrently. At the end of the migration the initial instance is discarded safely due to that the new instance have the same iteratively updated state. Any other application modules receiving tokens from either of the handing over or target application module instances, discard the last arriving redundant token.

One alternative migration execution is when two instances of an application module execute at two network nodes associated with two sets of UEs. A migration execution then only transfers the state and tokens associated with the UE doing a hand over from the handing over network node to the target network node. Tokens are redirected towards the target network node. This enables a hand over when only operational information and communication messages need to be migrated, due to that an application module is already up and running In one embodiment the migration and/or the handover is effected from the first base station 740 to the second base station 745 through the X2 interface. In an alternative embodiment the migration and/or the handover is effected from the first base station 740 to the second base station 745 through the S1 interface routing the handover/migration via a server 730. It should be noted that a base station 740, 745 may be connected to more than one server 730, 735. In an alternative embodiment the migration and/or the handover is effected from the first base station 740 to the first (or possibly second) server 730 through the S1 interface.

In one embodiment the network node effecting the migration is configured to predict the handover if a low latency in the network is determined to be critical pre-load the application module software to potential handover targets.

In one embodiment the prediction is primitive, for example to preload all neighboring base stations.

In one embodiment the prediction is based on statistics of heuristics of the user, e.g. which base stations 740, 745 the user has previously utilized for extended periods of time, assuming that the user is likely to return to such base stations' coverage.

In one embodiment the prediction can involve device/application specific information from the user or the application, for example a GPS application in a vehicle.

In one embodiment the network node effecting the migration is configured to prepare the application module logic just to instantiate the corresponding software when logic (binary) is stored (cached) on the receiving network node. If the application module logic is not stored, then transfer the application module logic first from either the current base station or other base stations or from a storage on a backhaul of the network or even from the internet.

In one embodiment, when several application modules are to be migrated over the same channel, each application module could be migrated individually as disclosed above to minimize impact on the execution.

In addition all application modules need not be migrated at the same time, since the internal communication between the application modules that make up the server part of the application, also communicate asynchronously.

By utilizing micro data centers which are servers built into base stations or situated close to one or several base stations brings about the benefit of reducing the latency from UEs to these computation resources and potentially also reduce the traffic from the base station due to that the task is accomplished in the server and less traffic needs to be sent thru the backhaul to e.g. internet connected servers.

Another benefit of the teachings herein lies in that the mobile communications terminal will be enabled to adapt to high processor loads and ensure that the input received is timed correctly to the display of a changed user interface state.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A network node comprising a memory and a controller, wherein said controller is configured to:
    detect that a handover for a mobile communications terminal from a first base station to a second base station is to be effected and in response thereto:
    determine if a first application module associated with the mobile communications terminal is to be migrated, wherein:
        an application is divided into a plurality of application modules which are distributed to various network nodes that execute the application modules according to an actor-dataflow model, wherein the plurality of application modules includes the first application module, and
        the first application module is executed on a first micro data center; and
    if a determination is that the first application module associated with the mobile communications terminal is to be migrated, then,
    cause a migration of said first application module to be performed from the first micro data center to a receiving network node,
    wherein the controller is further configured to:
        receive a query response, the query response indicating an association between the mobile communications terminal and the first application module;
        receive a second query response from a second network node indicating that the second network node is currently executing a second application module associated with the mobile communications terminal; and
        cause a migration of the second application module to be performed, and
    wherein the determination is based on the programming and/or constraints of the corresponding application, the resources of the network nodes currently executing one or more of the application modules and/or the resources of a receiving network node, and
    wherein the controller is configured to migrate the application module and the second application module by:
        preparing the receiving network node to set up application module logic;
        transferring the state of the first application module and the second application module to the receiving network node; and
        redirecting inter application module communication to the receiving network node.

2. The network node according to claim 1, wherein said controller is further configured to receive a query response from a database, the query response indicating an association between the mobile communications terminal and the first application module.

3. The network node according to claim 2, wherein said memory is configured to store said database and wherein said database comprises at least one association between an application module and a mobile communications terminal.

4. The network node according to claim 1, wherein said controller is further configured to base said determination on whether the mobile communications terminal is controlling said first application module and if so migrate said first application module.

5. The network node according to claim 1, wherein the first application module is associated with a plurality of mobile communications terminals and said controller is further configured to base said determination on whether a threshold portion of the plurality of mobile communications terminals has been or are detected to be handed over during the execution of the first application module and if so migrate said first application module.

6. The network node according to claim 1, wherein said controller is further configured to base said determination on available resources.

7. The network node according to claim 1, wherein said controller is further configured to:
    receive an input on said determination, wherein said input on said determination comprises a command or information to base the determination on; and to
    base said determination on said received input.

8. The network node according to claim 1, wherein said controller is further configured to:
    pause the execution of said application module prior to:
        transferring the state of said first application module and
        redirecting inter application module communication,
    and to thereafter unpause said application module.

9. The network node according to claim 1, wherein the first application module is being executed by said network node.

10. The network node according to claim 1, wherein the first application module is being executed by another network node.

11. The network node according to claim 1, wherein the network node is a mobile communications terminal.

12. The network node according to claim 1, wherein the network node is a base station.

13. The network node according to claim 1, wherein the network node is a server.

14. A method for use in a mobile communications network comprising a first base station, a second base station and a mobile communications terminal, said method comprising:
    detecting a handover for the mobile communications terminal from the first base station to the second base station; and in response thereto:

determine if a first application module associated with the mobile communications terminal is to be migrated, wherein:
  an application is divided into a plurality of application modules which are distributed to various network nodes that execute the application modules according to an actor-dataflow model, wherein the plurality of application modules includes the first application module, and
  the first application module is executed on a first micro data center; and
if a determination is that the first application module associated with the mobile communications terminal is to be migrated, then,
causing a migration of said first application module to be performed from the first micro data center to a receiving network node,
wherein the method further comprises:
  receiving a query response, the query response indicating an association between the mobile communications terminal and the first application module;
  receiving a second query response from a second network node indicating that the second network node is currently executing a second application module associated with the mobile communications terminal; and
  causing a migration of the second application module to be performed, and
wherein the determination is based on the programming and/or constraints of the corresponding application, the resources of the network nodes currently executing one or more of the application modules and/or the resources of a receiving network node, and
wherein the migration of the application module and the second application module comprises:
  preparing the receiving network node to set up application module logic;
  transferring the state of the first application module and the second application module to the receiving network node; and
  redirecting inter application module communication to the receiving network node.

15. A nontransitory computer readable storage medium encoded with instructions that, when executed on a processor, perform a method for use in a mobile communications network comprising a first base station, a second base station and a mobile communications terminal, said method comprising:
  detecting a handover for the mobile communications terminal from the first base station to the second base station; and in response thereto:
  determine if a first application module associated with the mobile communications terminal is to be migrated, wherein:
    an application is divided into a plurality of application modules which are distributed to various network nodes that execute the application modules according to an actor-dataflow model, wherein the plurality of application modules includes the first application module, and
    the first application module is executed on a first micro data center; and
  if a determination is that the first application module associated with the mobile communications terminal is to be migrated, then,
  causing a migration of said first application module to be performed from the first micro data center to a receiving network node,
  wherein the method further comprises:
    receiving a query response, the query response indicating an association between the mobile communications terminal and the first application module;
    receiving a second query response from a second network node indicating that the second network node is currently executing a second application module associated with the mobile communications terminal; and
    causing a migration of the second application module to be performed, and
  wherein the determination is based on the programming and/or constraints of the corresponding application, the resources of the network nodes currently executing one or more of the application modules and/or the resources of a receiving network node, and
  wherein the migration of the application module and the second application module comprises:
    preparing the receiving network node to set up application module logic;
    transferring the state of the first application module and the second application module to the receiving network node; and
    redirecting inter application module communication to the receiving network node.

16. The nontransitory computer readable storage medium according to claim 15, wherein said instructions comprise said application module, and/or a state for said application module.

* * * * *